United States Patent
Kashiwamoto et al.

(10) Patent No.: US 10,214,653 B2
(45) Date of Patent: Feb. 26, 2019

(54) REFRACTORY ARTICLE AND PRODUCTION METHOD THEREOF

(71) Applicant: Covestro Deutschland AG, Leverkusen (DE)

(72) Inventors: Yuudai Kashiwamoto, Higashiosaka (JP); Toshikazu Momii, Kobe (JP); Masayuki Fujidai, Kobe (JP)

(73) Assignee: COVESTRO DEUTSCHLAND AG, Leverkusen (DE)

( * ) Notice: Subject to any disclaimer, the term of this patent is extended or adjusted under 35 U.S.C. 154(b) by 0 days.

(21) Appl. No.: 15/342,236

(22) Filed: Nov. 3, 2016

(65) Prior Publication Data

US 2017/0130067 A1    May 11, 2017

(30) Foreign Application Priority Data

Nov. 9, 2015 (JP) .................................. 2015-219390

(51) Int. Cl.
*C09D 5/18* (2006.01)
*C09D 175/06* (2006.01)
(Continued)

(52) U.S. Cl.
CPC ............ *C09D 5/18* (2013.01); *B29C 45/0001* (2013.01); *B29C 45/14* (2013.01); *C08G 18/092* (2013.01); *C08G 18/2036* (2013.01); *C08G 18/4825* (2013.01); *C08G 18/7664* (2013.01); *C08G 18/792* (2013.01); *C09D 175/06* (2013.01); *B29C 67/246* (2013.01);
(Continued)

(58) Field of Classification Search
CPC ... B29C 45/0001; B29C 45/14; B29C 67/246; B29K 2075/00; B29K 2249/00; B29K 2711/14; B29K 2995/0016; B29L 2031/10; C08G 18/092; C08G 18/2036; C08G 18/4825; C08G 18/7664; C08G 18/792; C08K 2003/026; C08K 2003/2227; C08K 3/016; C08K 3/22; C08K 5/0066; C08K 5/34924; C08K 5/521; C09D 175/06; C09D 5/18
USPC ................ 428/422.8, 425.1; 524/115, 590
See application file for complete search history.

(56) References Cited

U.S. PATENT DOCUMENTS 3,899,443 A * 8/1975 Reymore, Jr. ....... C08G 18/092
502/164
4,094,869 A * 6/1978 Biranowski .......... C08G 18/092
521/118
(Continued)

FOREIGN PATENT DOCUMENTS

JP    2005036456 A    2/2005
JP    2005048585 A    2/2005
(Continued)

*Primary Examiner* — Thao T Tran
(74) *Attorney, Agent, or Firm* — N. Denise Brown

(57) ABSTRACT

The present invention provides a refractory article which is fire resistant, heat resistant, and light weight, and which is suitable for use as a building material. The refractory article comprises (1) a core material and (2) a refractory layer which covers one or more surface of the core material, and comprises a polyisocyanurate resin. The core material (1) may be a glued laminated timber. Suitable polyisocyanurate resins may be obtained by reaction of a polyisocyanate in the presence of a polyol. A flame retardant may be present in the polyisocyanurate resin.

7 Claims, 3 Drawing Sheets

(51) Int. Cl.
*B29C 45/00* (2006.01)
*B29C 45/14* (2006.01)
*C08G 18/48* (2006.01)
*C08G 18/76* (2006.01)
*C08G 18/79* (2006.01)
*C08G 18/09* (2006.01)
*C08G 18/20* (2006.01)
*C08K 3/016* (2018.01)
*B29K 711/14* (2006.01)
*B29L 31/10* (2006.01)
*C08K 3/22* (2006.01)
*C08K 5/00* (2006.01)
*B29K 75/00* (2006.01)
*B29C 67/24* (2006.01)
*C08K 5/3492* (2006.01)
*C08K 5/521* (2006.01)
*C08K 3/02* (2006.01)

(52) U.S. Cl.
CPC ...... *B29K 2075/00* (2013.01); *B29K 2249/00* (2013.01); *B29K 2711/14* (2013.01); *B29K 2995/0016* (2013.01); *B29L 2031/10* (2013.01); *C08K 3/016* (2018.01); *C08K 3/22* (2013.01); *C08K 5/0066* (2013.01); *C08K 5/34924* (2013.01); *C08K 5/521* (2013.01); *C08K 2003/026* (2013.01); *C08K 2003/2227* (2013.01)

(56) References Cited

U.S. PATENT DOCUMENTS

| | | | | |
|---|---|---|---|---|
| 2006/0182922 | A1* | 8/2006 | Ishida | C08G 18/0828 428/44 |
| 2014/0234560 | A1* | 8/2014 | Miyata | E04D 13/1675 428/35.7 |
| 2016/0245451 | A1* | 8/2016 | Okada | C09K 21/02 |
| 2016/0251491 | A1* | 9/2016 | Okada | C09K 21/02 252/62 |

FOREIGN PATENT DOCUMENTS

| | | |
|---|---|---|
| JP | 2008031743 A | 2/2008 |
| JP | 2015061969 A | 4/2015 |

* cited by examiner

[Fig. 1]
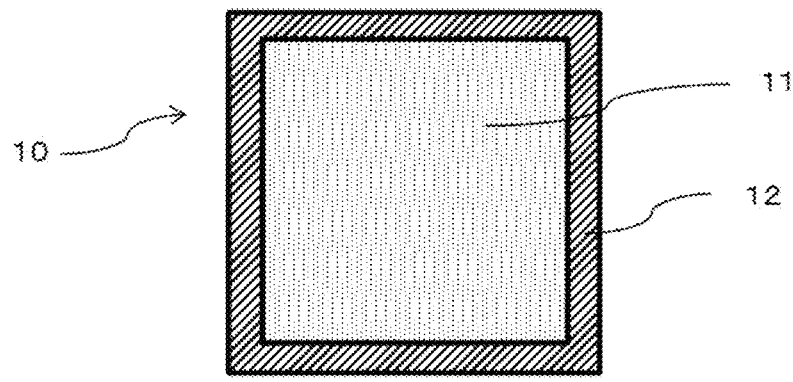
[Fig. 2]
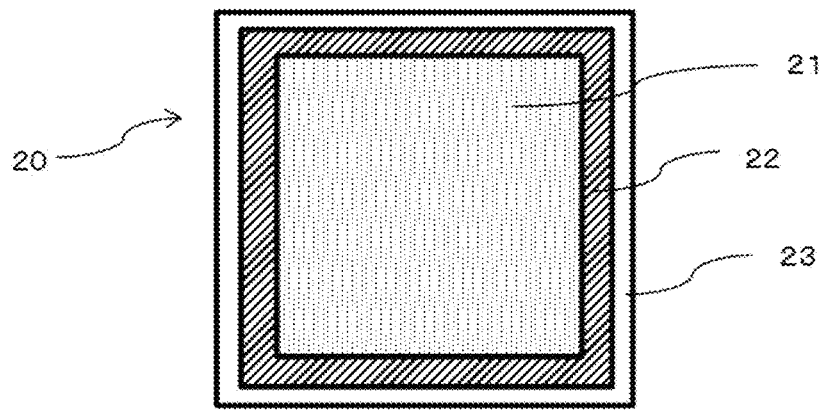

[Fig. 3]
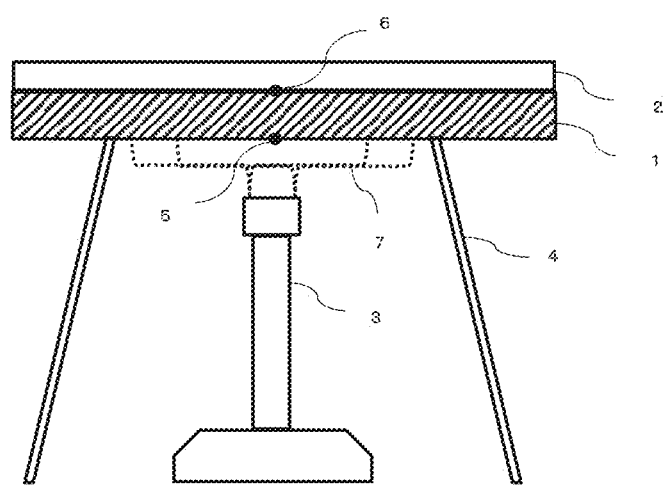

[Fig. 4]
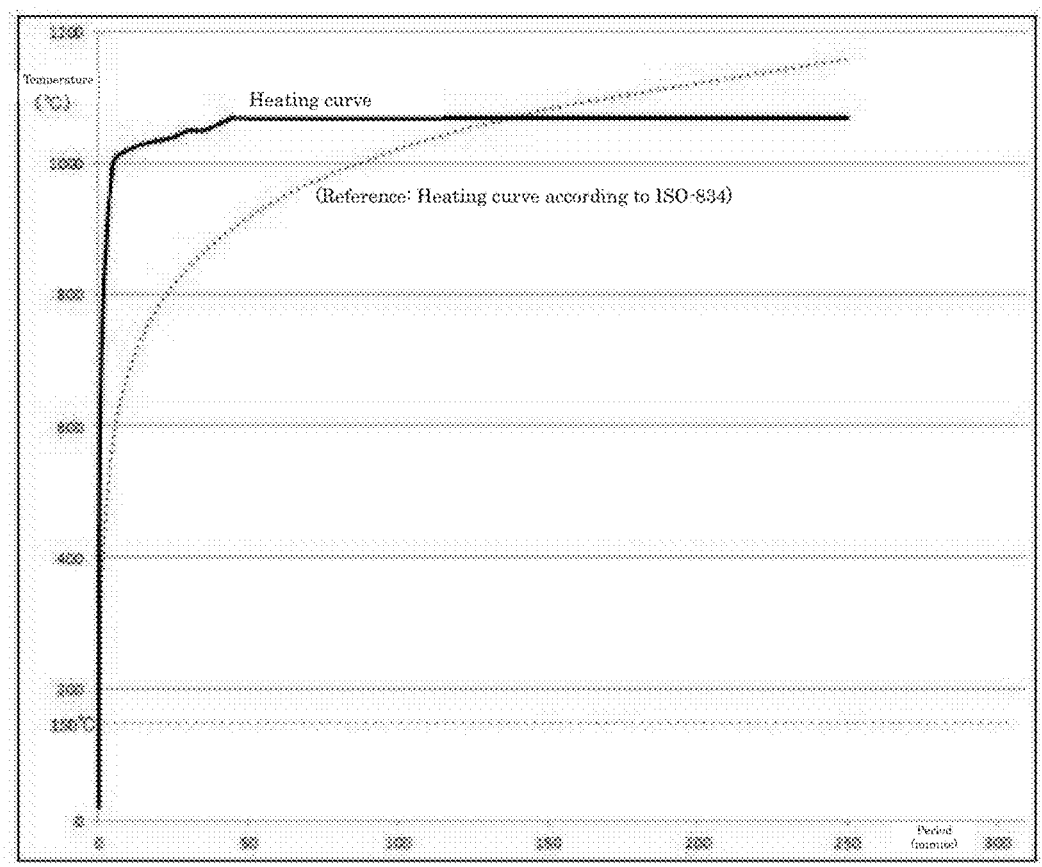

REFRACTORY ARTICLE AND PRODUCTION METHOD THEREOF

CROSS-REFERENCE TO RELATED APPLICATION

This application claims priority to Japanese Application No. 2015-219390 filed Nov. 9, 2015, which is herein incorporated by reference.

FIELD

The present invention relates to a refractory article that can be used as a structural construction material and a production method thereof.

BACKGROUND

After revision of the Building Standards Law in 2000, it became possible to use various materials and structural methods, if they satisfy certain performance requirements with respect to fire resistance. Although refractory structures were traditionally restricted to those made of incombustible materials such as steel constructions and reinforced concrete constructions, it is now possible to use a flammable material such as wood, if it is shown to have a particular fire resistance. Wood, a material renewable by afforestation, is a building material that is environment-friendly and can be used as a means for reducing carbon dioxide gas. Accordingly, it is desired to actively expand domestic woods, a resource abundant in Japan.

Under the Building Standards Law, the refractory building should remain undestroyed even after termination of a fire and retain the fire resistance (such as, for example, load-supporting potential, heat-insulating property, and flame-insulating property) which is expected of the members even after application of a refractory heating. In a typical method of testing fire resistance, a sample is heated in a refractory oven along the standard fire heating temperature curve (ISO-834) specified by the International Organization for Standardization and then held in the oven for a period three times as long as the heating period. The sample is examined to determine whether the sample stops burning reliably after the refractory test by analyzing the deformation and the deformation rate of the sample during the heating period. This is a strict requirement for common wooden columns and beams, and it is difficult for these wooden members to satisfy this requirement.

Various structural materials have been proposed for making a refractory structure comprising a glued laminated timber which is made of flammable woods. For example, Japanese Unexamined Patent Application Publication No. 2005-036456, Japanese Unexamined Patent Application Publication No. 2005-048585, and Japanese Unexamined Patent Application Publication No. 2008-031743 describe composite wood-based structural materials such as laminate timbers and glued laminated timbers. Such a structural material comprises, for example, a glued laminated timber having certain strength as its core material and inorganic materials such as gypsum board, mortar, and cement, various flame retardant components, and flame retardant-treated or high-density woods as the refractory layer formed around the external surface of the core material. However, for production of such a structural material, multiple boards or plates having a particular size should be prepared and high-viscosity materials should be coated on the surface of the core material surface, and thus, the production steps become very complicated. In addition, it is more difficult to produce a structural material with an arbitrary cross-sectional shape (e.g., circular cross section) and thus, production of such structural materials becomes very tedious.

Japanese Unexamined Patent Application Publication No. 2015-061969 proposes a refractory structural material comprising a refractory layer of a polyisocyanurate resin. The structural material solves the problems described above, but the fire resistance thereof is still far from sufficient.

SUMMARY

An object of the present invention is to provide a refractory article having a refractory layer superior in fire resistance and a method for producing the refractory article that is simpler than conventional methods.

Another object thereof is to provide a simple and convenient method for production of a refractory article having an arbitrary cross-sectional shape (such, as, e.g., circular cross section).

The present invention provides a refractory article comprising
(1) a core material and
(2) a refractory layer comprising a polyisocyanurate resin.

The present invention also provides a method for producing a refractory article, comprising
(i) placing a frame around the external periphery of a core material with a space between the core material and the frame;
(ii) injecting a raw polyisocyanurate liquid into the space between the core material and the frame; and
(iii) forming a solid polyisocyanurate resin layer by reacting the raw polyisocyanurate liquid.

Various embodiments of the present invention include those described below:
<1>
Certain embodiments of the present invention are directed to a refractory article, comprising
(1) a core material and
(2) a refractory layer covering one or more surfaces of the core material and comprising a polyisocyanurate resin, wherein:
the polyisocyanurate resin comprises the reaction product of a polyisocyanate and an active hydrogen-containing compound; in which the active hydrogen-containing compound comprises a polyol having two or more hydroxyl groups and having a hydroxyl number of 120 to 2000 mg-KOH/g, a functionality of 2 to 4, and a molecular weight of 50 to 2000; and
from 5 to 30 parts by weight of active hydrogen-containing compound are used per 100 parts by weight of the polyisocyanate.
<2>
In certain embodiments, the invention is directed to the refractory article in the previous paragraph, wherein the polyisocyanurate resin additionally comprises a flame retardant.
<3>
In certain embodiments, the invention is directed to the refractory article in any of the previous two paragraphs, wherein the polyisocyanurate resin comprises the reaction product of a polyisocyanate with an active-hydrogen containing compound in the presence of an isocyanuration catalyst.

<4>
In certain embodiments, the invention is directed to the refractory article in any of the previous three paragraphs, wherein:
the flame retardant comprises from 10 to 20 parts by weight of aluminum hydroxide and from 5 to 10 parts by weight of red phosphorus, based on 100 parts by weight of the polyisocyanate wherein the weight ratio of aluminum hydroxide to red phosphorus is 1:1 to 4:1.
<5>
In certain embodiments, the invention is directed to the refractory article in any of the previous four paragraphs, wherein the core material (1) is a glued laminated timber.
<6>
In certain embodiments, the invention is directed to the refractory article in any one of the previous five paragraphs, wherein the polyisocyanate comprises at least one polyisocyanate selected from the group consisting of aromatic polyisocyanates, aliphatic polyisocyanates, alicyclic polyisocyanates, and the modified products thereof.
<7>
In certain embodiments, the invention is directed to the refractory article any one of the previous six paragraphs, additionally comprising (3) a surface layer surrounding the outside of the refractory layer comprising the polyisocyanurate resin (2).
<8>
In certain embodiments, the invention is directed to the refractory article in any one of the previous seven paragraphs, wherein the refractory article is a structural member selected from the group consisting of column, beam, wall, floor, girder, brace and sill.
<9>
In certain embodiments, the invention is directed to a method for producing the refractory article in any one of the previous eight paragraphs, comprising
(i) placing a frame around the external periphery of a core material with a space between the core material and the frame;
(ii) injecting a raw polyisocyanurate liquid into the space between the core material and the frame; and
(iii) forming a solid polyisocyanurate resin layer by reacting the raw polyisocyanurate liquid.

According to the present invention, it is possible to produce a refractory article by a method simpler than conventional methods.

It is also possible to produce a refractory article with an arbitrary cross-sectional shape (such as, e.g., a circular cross section) in simple steps.

The refractory article according to the present invention has favorable fire resistance, heat resistance, fire safety, and heat-insulating properties. The refractory article according to the present invention is light weight, as the polyisocyanurate resin used for the refractory layer has a specific density (approximately 1.2) which is lower than that of gypsum or mortar.

BRIEF DESCRIPTION OF THE DRAWINGS

FIG. 1 is a cross-sectional view showing an embodiment of a refractory article having a core material and a refractory layer.

FIG. 2 is a cross-sectional view showing another embodiment of a refractory article having a core material, a refractory layer, and a surface layer.

FIG. 3 is a drawing showing the equipment arrangement for the combustion test method of burning a sample with a gas burner.

FIG. 4 is a drawing showing a heating curve for a sample in accordance with the invention in the combustion test using the equipment as shown in FIG. 3 in comparison to the heating curve.

DETAILED DESCRIPTION

The refractory article according to the present invention comprises a core material, and a refractory layer covering one or more surfaces of the core material, and in an optional embodiment additionally comprises an external surface layer on the refractory layer.

The present invention will now be described with specific reference to the drawings. The components in FIGS. 1 and 2 may not be drawn to actual reduced scale.

FIG. 1 is a cross-sectional view of an embodiment of the refractory article 10 having a core material 11 and a refractory layer 12. In the refractory article 10, a refractory layer 12 is placed around the core material 11. In some embodiments, the refractory layer 12 is in contact with the core material 11. In an alternate embodiment, there may be an intermediate layer (not shown in the Figure) between the core material 11 and the refractory layer 12. The intermediate layer may, for example, be made of one or both of a material that favorably adheres to both the core material 11 and the refractory layer 12 (such as, e.g., an adhesive agent) and a high-heat resistance material (such as, e.g., metal, particularly iron).

FIG. 2 is a cross-sectional view of another embodiment of the refractory article 20 having a core material 21, a refractory layer 22, and a surface layer 23. In the refractory article 20, a refractory layer 22 is placed around a core material 21 and a surface layer 23 is placed around the refractory layer 22. In some embodiments, the refractory layer 22 is in contact with the core material 21 and the surface layer 23. In an alternate embodiment, there may be an intermediate layer (not shown in the Figure) formed either or both between the core material 21 and the refractory layer 22 and/or between the refractory layer 22 and the surface layer 23. The intermediate layer may, for example, be made of one or both of a material that favorably adheres to the core material 21, the refractory layer 22, and the surface layer 23 (such as, e.g., an adhesive agent) and/or a high-heat resistance material (such as, e.g., metal, particularly iron). The surface layer 23 functions as a burning marginal layer. The surface layer 23 may also function as a decoration layer.

The refractory articles as shown in FIGS. 1 and 2 are quadrangular prisms having a square cross section.

Although FIGS. 1 and 2 show embodiments of the invention wherein the refractory article has a square cross section, the cross section of the refractory article may not be square. Some examples of the other cross-sectional shapes which are suitable for the refractory article include rectangle (e.g., plate shape), polygons other than quadrangle, circle, and ellipse.

When the refractory article is, for example, plate-shaped, the refractory article may have a plate-shaped core material, a refractory layer covering one or two main surfaces of the core material and, optionally, as needed, a surface layer covering the one or two (normally one) refractory layers.

The size of the core material varies according to the application of the refractory article. The thickness of the refractory layer is not particularly limited, but is typically at least 1 mm, or at least 2 mm, or at least 5 mm. The thickness of the refractory layer is typically 200 mm or less, of 50 mm or less, or 45 mm or less. The thickness of the refractory layer may range between any combination of these upper and lower values, inclusive, such as from 1 to 200 mm, or from 2 to 50 mm, or from 5 to 45 mm. The thickness of the surface layer is not particularly limited, but is typically at least 0.1 mm, or at least 0.2 mm, or at least 1 mm. The thickness of the surface layer is also typically 100 mm or less, or 50 mm or less, or 30 mm or less. The thickness of the surface layer may range between any combination of these upper and lower values, inclusive, such as from 0.1 to 100 mm, or from 0.2 to 50 mm, or from 1 to 30 mm.

The core material may be a common wood, a solid wood, a glued laminated timber, a CLT (Cross Laminated Timber), or the like.

The refractory layer comprises a polyisocyanurate resin. The polyisocyanurate resin is a resin having an isocyanurate ring structure obtained by trimerization of polyisocyanate. Polyisocyanurate resins are normally prepared by reaction of a polyisocyanate in the presence of a catalyst such as an isocyanuration (trimerization) catalyst. In one embodiment of the present invention, a polyisocyanate is subjected to isocyanuration in the presence of an isocyanate-reactive active hydrogen-containing compound (e.g., a polyol). The polyisocyanurate resin is solid at normal temperature (i.e. about 20° C.). The polyisocyanurate resin is typically a non-foaming material.

In the present invention, part of the polyisocyanate reacts with an isocyanate-reactive active hydrogen-containing compound (by way of a urethane reaction). The urethanation and isocyanuration may be carried out sequentially (separately) or simultaneously. The molar ratio of the isocyanate group to be isocyanurated to the isocyanate group to be urethanated may range from 1.0:0.018 to 1.0:0.59, or from 1.0:0.02 to 1:0.50.

Suitable polyisocyanates for the invention include those which are commonly used in production of polyurethane resins. Some examples of such isocyanates include aromatic polyisocyanates, aliphatic polyisocyanates, alicyclic polyisocyanates, the modified products thereof (such as, e.g., urethane group, carbodiimide group, allophanate groups urea group, biuret group, isocyanurate group, and oxazolidone group-containing modified products), and the mixtures of two or more thereof.

Some examples of suitable aromatic polyisocyanates include 1,3- and/or 1,4-phenylene diisocyanate, 2,4- and/or 2,6-tolylene diisocyanate (TDI), polymeric TDIs (also referred to as crude TDIs), 2,4'- and/or 4,4'-diphenylmethane diisocyanate (MDI), polymethylene polyphenyl polyisocyanates (also referred to as crude MDIs or polymeric MDIs), polyaryl polyisocyanates (PAPIs), and the like.

Examples of suitable aliphatic polyisocyanates include aliphatic diisocyanates having 2 to 18 carbon atoms and the like. Typical examples thereof include 1,6-hexamethylene diisocyanate, lysine diisocyanate, and the like.

Some examples of the suitable alicyclic polyisocyanates include alicyclic diisocyanates having 4 to 16 carbon atoms and the like. Typical examples thereof include isophorone diisocyanate (IPDI), 4,4'-dicyclohexyl-methane diisocyanate, norbornane diisocyanate, and the like.

In one embodiment, the polyisocyanate comprises an aromatic polyisocyanate such as, for example, a polymethylene polyphenylene polyisocyanate (polymeric MDI).

In general, a catalyst (isocyanuration catalyst) is used for acceleration of the isocyanurate ring formation. Examples of the isocyanuration catalysts that can be used include, for example, aromatic compounds such as tris(dimethylaminomethyl)phenol, 2,4-bis(dimethylaminomethyl)phenol, and 2,4,6-tris(dialkylaminoalkyl)hexahydro-S-triazines; alkali metal carboxylate salts such as potassium acetate, potassium 2-ethylhexanoate, and potassium octanoate; quaternary ammonium salts of carboxylic acids and the like. The amount of the isocyanuration catalyst used may vary between 0.01 to 10 parts by weight, based on 100 parts by weight of the polyisocyanate.

In accordance with the present invention, an isocyanate-reactive active hydrogen-containing compound is also present. The isocyanate-reactive active hydrogen-containing compound is typically a polyol having two or more hydroxyl groups in the molecule.

The number of the hydroxyl groups in the polyol (i.e. the functionality) ranges from 2 to 4. The hydroxyl number ranges from 120 to 2000 mg-KOH/g. The polyol typically has a hydroxyl number of, for example, at least 120, or at least 150, or at least 200. The hydroxyl number of the polyol is also typically 2000 or less, or 1500 or less. Thus the hydroxyl number of the polyol may vary between any combination of these upper and lower values, inclusive, such as from 120 to 2000, or from 150 to 1500, or from 200, to 1500 mg-KOH/g. The molecular weight (i.e. the number-average molecular weight) thereof ranges from 50 to 2000. The polyol typically has a molecular weight of at least 50, or at least 60. The polyol also typically has a molecular weight of 2000 or less, or 1500 or less, or 1300 or less. The molecular weight of the polyol typically ranges between any combination of these upper and lower values, inclusive, such as, for example, from 50 to 2000, or from 60 to 1500, or from 60 to 1300. Examples of the low-molecular weight compounds suitable for the present invention include glycols such as ethylene glycol, propylene glycol, diethylene glycol, and glycerol.

In another embodiment, the active hydrogen containing compound may be a hydrocarbon compound wherein one or more hydrogen atoms are substituted with hydroxyl or amino groups or a polyoxyalkylene group adduct of the substitution compound, i.e., a polyether polyol. The oxyalkylene may have from 2 to 5 carbon atoms, Examples of such oxyalkylenes include propylene oxide, ethylene oxide, and the like.

In the present invention, the refractory article satisfies the requirements of fire resistance (flame resistance) when the properties of the polyol are in this range.

In accordance with the present invention, the polyol described above is significantly effective in accelerating the isocyanuration reaction smoothly and improving the rigidness and the flame resistance of the polyisocyanurate resin produced. In addition, as these compounds are relatively less viscous, the polyol is also effective in facilitating handling such as mixing with various additives described hereinbelow and with the polyisocyanate.

The amount of the polyol present is typically at least 5, or at least 6 parts by weight, based on 100 parts by weight of the polyisocyanate component. The amount of polyol present is also typically less than or equal to 30, or less than or equal to 25 parts by weight, based on 100 parts by weight of the polyisocyanate component. Thus, the amount of polyol typically present ranges between any combination of these upper and lower values, inclusive, such as, for example, from 5 to 30 parts by weight, or from 6 to 25 parts by weight, based on 100 parts by weight of the polyisocyanate component. When the amount of the polyol used does not exceed 30 parts by weight, based on 100 parts by weight of the polyisocyanate component, the resultant polyisocyanurate resin has a lower rate of urethane binding groups, which in turn leads to higher heat resistance.

As needed, additives such as plasticizers, flame retardants, inorganic fillers, reinforcing materials, surfactants, organic and inorganic pigments, colorants, UV and heat stabilizers, and fungistatic or bacteriostatic substances are included in the formulation to produce the polyisocyanurate resin.

The additives may or may not react with the isocyanate groups of the polyisocyanate. In one embodiment of the invention, the additives do not react with the isocyanate groups. Thus, in this embodiment, the additives do not have any isocyanate group-reactive active hydrogen.

Examples of suitable plasticizers for the invention include carboxylic esters (e.g., alkanedicarboxylic esters and arylcarboxylic esters), phosphoric esters, halogenated phosphoric esters (e.g., tris(chloroethyl) phosphate and tris(β-chloropropyl) phosphate), and the like. Typical examples of the plasticizers include dioctyl phthalate, dibutyl phthalate, dioctyl adipate and tricresyl phosphate. In general, the addition of a plasticizer leads to improvement in the rigidness of the polyisocyanurate resin.

Some examples of suitable flame retardants for the invention include metal oxides (e.g., iron oxide, titanium oxide, and cerium oxide), metal hydroxides (e.g., aluminum hydroxide), bromine compounds (e.g., brominated diphenylethers, brominated diphenylalkanes, and brominated phthalimides), phosphorus compounds (e.g., red phosphorus, phosphoric esters, phosphoric ester salts, phosphoric amides, and organic phosphine oxides), and nitrogen compounds (e.g., ammonium polyphosphate, phosphazenes, triazines, and melamine cyanurates). These flame retardants may be used alone or in virtually any combination with each other.

In accordance with the present invention, it is possible to further improve the flame resistance by using the polyol described above and a combination of flame retardants. One particular combination of flame retardants comprises a combination of aluminum hydroxide and red phosphorus.

One specific combination of aluminum hydroxide and red phosphorus which is particularly effective in improving flame resistance in the present invention, is as follows: When the flame retardant comprises aluminum hydroxide and red phosphorus in amounts such that the amount of aluminum hydroxide is from 10 to 20 parts by weight, and the amount of red phosphorus is from 5 to 10 parts by weight, based on 100 parts by weight of the polyisocyanate component used to produce the polyisocyanurate resin. In addition, when the weight ratio of aluminum hydroxide to red phosphorus ranges from 1:1 to 4:1 the flame resistance of the refractory article is significantly improved.

The red phosphorus suitable for use in the present invention is not restricted. Various products in the market can be used as selected.

Some suitable examples of such red phosphorus products in the market include Nova Red 120, 120UF, and 120UFA, Nova Excel 140 and 140F manufactured by Rin Kagaku Kogyo Co., Ltd. The aluminum hydroxide for use in the present invention is also not restricted. Various products known in the market can be used in the present invention. Examples of suitable aluminum hydroxide products in the market include C-12, C-31, and C-F-1 manufactured by Sumitomo Chemical Co., Ltd. When selecting a the flame retardant, the ability of the flame retardant to be agitated and/or mixed with the polyol and the polyisocyanate should be taken into consideration. Likewise, flame retardants which have a shape such as, for example, a solid pellet) which hinders mixing and those in the shape of, for example, fibers, which increase viscosity are unfavorable. Selection of the flame retardants should be made properly according to the actual condition of use. The flame retardant may have, for example, be in powder or liquid form.

Some examples of the inorganic fillers and reinforcing materials include barium sulfate, porous diatomaceous earth, whiting, mica, talc, particularly glass fibers, glass flakes, glass beads, aramide fibers or carbon fibers, and the like.

The amount of the additives may vary between 0 to 100 parts by weight, or from 1 to 50 parts by weight, based on 100 parts by weight of the polyisocyanate.

The polyisocyanurate resin according to the present invention is a resin containing an isocyanurate ring structure obtained by trimerization of a polyisocyanate using an isocyanuration (trimerization) catalyst.

In the present invention, the polyol compound reacts with a polyisocyanate and the isocyanate index (NCO Index) may range from 170 to 5600. The isocyanate index is typically at least 170, or at least 200. In addition, the isocyanate index is typically less than or equal to 5600 or less than or equal to 5000. Thus, the isocyanate index may vary between any combination of these upper and lower ranges, inclusive, such as, for example, from 170 to 5600, or from 200 to 5000.

In the present invention, the isocyanate index is a value obtained by dividing the total number of isocyanate groups in the polyisocyanate by the total number of isocyanate group-reactive active hydrogen atoms, such as those in hydroxyl and amino groups, in the poly(mono)ol and multiplying the quotient by 100. When the number of the isocyanate group-reactive active hydrogen atoms is identical stoichiometrically with the number of the isocyanate groups in the polyisocyanate, the isocyanate index is 100.

The isocyanurate ring structure is particularly favorable for the applications of the present invention, as it has excellent heat resistance. However, other components may be introduced thereto under the condition that the resin generated does not significantly lose its heat resistance. In the present invention, urethane binding groups are introduced partially, using a polyol such as that described above. Not wishing to be bound by any theory it is likely that the introduction of these suitable urethane binding groups is effective in compensating for the fragility of the isocyanurate ring structure and improves fire resistance (flame resistance) by inhibiting cracking of the sample during the combustion test. If the sample cracks during the combustion test, flame or heat travels rapidly through the openings formed, leading to deterioration of fire resistance (flame resistance). In addition, another kind of binding groups, such as biuret groups, allophanate groups, or carbodiimide groups, may be introduced into the polyisocyanurate resin to the extent that the fire resistance is not significantly lowered.

The surface layer of the refractory article may be made of any material, but is preferably made of wood. The surface layer, which may serve as a decoration layer, also functions as a burning marginal layer.

The refractory article can be produced by a production method comprising:
(i) placing a frame around the external periphery of a core material with a space between the core material and the frame;
(ii) injecting a raw polyisocyanurate liquid into the space between the core material and the frame; and
(iii) forming a solid polyisocyanurate resin layer by reacting the raw polyisocyanurate liquid.

In (i), the frame is placed around the core material in such a way that the raw polyisocyanurate liquid does not leak out of the frame. A refractory layer (polyisocyanurate resin layer) is formed in the space between the core material and the frame.

In (ii), the raw polyisocyanurate liquid, which is a liquid obtained by mixing the polyisocyanate and an isocyanuration catalyst, is filled or injected into the space between the core material and the frame. The raw polyisocyanurate liquid contains an isocyanate-reactive active hydrogen-containing compound (such as, e.g., a polyol and, as needed, a monool). The raw polyisocyanurate liquid may optionally contain additives and others auxiliary agents.

In (iii), isocyanuration and urethanation reactions are carried out. The reaction temperature in step (iii) may be a normal temperature (such as, for example, 20° C.) or a higher temperature (such as, for example, from 30 to 100° C.). The period needed for the reaction, which depends on the reaction temperature, is generally 5 minutes to 24 hours.

It is possible in the present invention to achieve the object of the present invention by using the raw materials described above, however, polyisocyanate as the main ingredient has a viscosity of 1 to 5000 mPa·s in the normal temperature range (i.e. 20 to 25° C.); the polyol, the additives, and the like are also mostly low-viscosity liquids, and thus, these ingredients can be handled easily in the steps above.

The refractory layer produced therefrom is superior in fire resistance and gives high degree of freedom in designing the shape of the refractory article. It is thus possible to obtain refractory articles with the desired fire resistance in various shapes easily by adjusting the thickness of the refractory layer.

The thickness of the refractory layer (i.e. the distance between the core material and the frame in the first step of the production method) is generally kept mostly constant in one refractory article. This is because the fire resistance is proportional to the thickness of the refractory layer in the present invention, and any local difference, if present, in the thickness of the refractory layer, leads to an unfavorable difference in fire resistance.

The refractory article having a surface layer may be prepared by a method comprising (i) placing a surface layer inside the frame in such a way that there is a space formed between the surface layer and the core material. In this way, a refractory article having a surface layer is prepared easily. The polyisocyanurate resin is generally adhesive to the core material and/or to the surface layer, and thus has an advantage that use of an adhesive agent can be eliminated.

Alternatively, an article without surface layer may be prepared by the production method above and then the surface layer adhered thereto.

The refractory article can be used in applications which demand fire resistance. The refractory article can be used as a structural member, if a material having a suitable strength is selected as the core material. Some examples of the structural members include building structural members such as column, beam, wall, floor, girder, brace, and sill.

EXAMPLES

Hereinafter, the method according to the present invention will be described more in detail with reference to Examples.

All temperatures in the examples are in Celsius and all percentages are percent by wt, unless specified otherwise.

Components used in Examples were as follows:

Isocyanate 1: polymeric MDI, having an NCO content of 31.5%, and a viscosity of 180 mPa·s at 25° C.

Polyol 1: propylene oxide adduct-type polyether polyol having a hydroxyl number of 500 mg-KOH/g, a functionality of 2, a molecular weight of 220, and a viscosity of 500 mPa·s at 25° C.

Polyol 2: ethylene glycol, commercially available from Mitsubishi Chemical Corporation, having a hydroxyl number of 1810 mg-KOH/g, a functionality of 2, and a molecular weight of 62

Flame retardant 1: aluminum hydroxide C-31, commercially available from Sumitomo Chemical Co., Ltd.

Flame retardant 2: Nova Red 120UFA (red phosphorus), commercially available from Rin Kagaku Kogyo Co., Ltd.

Flame retardant 3: TCPP tris(β-chloropropyl) phosphate, (a phosphate ester) commercially available from Daihachi Chemical Industry Co., Ltd.

Flame retardant 4: Exolit OP1230, an organic phosphoric acid metal salt, commercially available from Clariant Flame retardant 5: melamine isocyanurate MC4000, commercially available from Nissan Chemical Industries, Ltd.

Catalyst 1: N,N',N"-tris(3-dimethylaminopropyl)hexahydro-s-triazine (an isocyanuration catalyst)

Example 1

10 parts by wt. of Polyol 1, 1 part by wt. of Catalyst 1, and 100 parts by wt. of Isocyanate 1 were mixed, to give a raw polyisocyanurate liquid. The raw polyisocyanurate liquid was poured into a mold (which measured 200 mm×200 mm×50 mm in thickness) and allowed to react at 20° C. for 3 hours, to form a solid unfoamed polyisocyanurate resin plate (200 mm×200 mm×15 mm in thickness). It was left still at normal temperature for 1 week and then used as a sample for heating test.

FIG. 3 is a schematic drawing showing the equipment arrangement for the combustion test method in which a sample is burned with a gas burner. Sample 1 and a sample cover 2 (which is made of a flame-resistant wood) are placed on a high-strength gas burner NRD 3 (natural gas, tip diameter: 28 mm, obtained from Tech-Jam Co., Ltd.) and a tripod 4. The sample 1 has a surface A (not shown) which is the heated surface facing the burner and a surface B (not shown) which is the non-heated surface opposite of surface A). A thermocouple that is connected to the position 5 on surface A and the position 6 on surface B determines the temperatures at positions 5 and 6. In FIG. 3, the flame 7 from the gas burner 8 is indicated by dotted lines.

As shown in FIG. 3, the sample 1 was placed on the tripod 4 directly and the bottom surface A of the sample 1 was heated by the flame 7 from the high-strength gas burner 8 at 1000° C. to 1100° C. The sample 1 was covered with a flame-resistant wood (i.e. sample cover 2) on the top. A thermocouple was connected to the surface A (burner-heated surface) of the sample 1 for confirmation that the temperature of the sample surface in the flame from the burner is kept at 1000° C. to 1100° C. The thermocouple was also connected to the surface B (non-heated surface) of the sample for measurement of the temperature change.

As the indicator of the temperature observation on the surface B, a temperature of 150° C. was set as the highest temperature at which the core material is considered not to be influenced. The period needed for the sample surface B to reach 150° C. was 32 minutes. Results are summarized in Table 1. During the heating test, the sample did not deform significantly and retained almost its original shape.

Examples 2 to 15

Each sample was prepared in the raw material composition shown in Table 1 and subjected to the heating test by a method similar to that in Example 1. The results are summarized in Table 1.

Comparative Example 1 (No Polyol Used)

A resin composition sample was prepared in accordance with the raw material composition shown in Table 2. The sample was subjected to the heating test by a method similar to that in Example 1. The results are summarized in Table 2.

The surface B of the sample reached 150° C. in a significantly shorter period, compared to the samples in Examples 1 to 15.

Comparative Examples 2 and 3

Samples were prepared in accordance with the raw material compositions shown in Table 2. The samples were subjected to the heating test by a method similar to that in Example 1, but the samples deformed significantly, thus prohibiting further evaluation. The results are summarized in Table 2.

Example 16 (Preparation of a Polyisocyanurate Resin-coated Column)

A quadrangular prism glued laminated timber of the size of 150 mm×150 mm×1000 mm was used as the core material; a wooden frame coated with a release agent was placed around it in the length direction with a 25 mm-width opening formed between the core material and the frame; and the resulting column was held vertically. The raw polyisocyanurate liquid used in Example 13 was poured into the opening and the resulting column was allowed to cure at a room temperature of 20° C. for 3 hours for completion of reaction. Subsequent removal of the outer frame gave a columnar article wherein the quadrangular prism glued laminated timber was covered with the polyisocyanurate resin. The polyisocyanurate resin and the glued laminated timber were bonded tightly to each other, and thus eliminated the need for use of an adhesive agent or the like.

When the polyisocyanurate resin-coated columnar article was cut with a (fret) saw, it could be cut easily without cracking in the cutting region.

TABLE 1

| Raw materials | unit: parts by weight | Example 1 | Example 2 | Example 3 | Example 4 | Example 5 | Example 6 | Example 7 | Example 8 |
|---|---|---|---|---|---|---|---|---|---|
| | | | Polyol | | | Polyol/flame retardant | | | |
| Polyisocyanate | Polyisocyanate 1 | 100 | 100 | 100 | 100 | 100 | 100 | 100 | 100 |
| Polyol | Polyol 1 | 10 | 30 | 0 | 10 | 10 | 10 | 10 | 10 |
| | Polyol 2 | 0 | 0 | 6 | 0 | 0 | 0 | 0 | 0 |
| Flame retardant | Flame retardant 1 | 0 | 0 | 0 | 10 | 20 | 0 | 0 | 0 |
| | Flame retardant 2 | 0 | 0 | 0 | 0 | 0 | 10 | 20 | 0 |
| | Flame retardant 3 | 0 | 0 | 0 | 0 | 0 | 0 | 0 | 10 |
| | Flame retardant 4 | 0 | 0 | 0 | 0 | 0 | 0 | 0 | 0 |
| | Flame retardant 5 | 0 | 0 | 0 | 0 | 0 | 0 | 0 | 0 |
| Catalyst | Catalyst 1 | 1 | 1 | 1 | 1 | 1 | 1 | 1 | 1 |
| | Isocyanate index | 840 | 280 | 388 | 840 | 840 | 840 | 840 | 840 |
| | Period until surface B temperature reach 150° C. (minutes) | 32 | 28 | 38 | 35 | 39 | 54 | 57 | 33 |

| Raw materials | unit: parts by weight | Example 9 | Example 10 | Example 11 | Example 12 | Example 13 | Example 14 | Example 15 |
|---|---|---|---|---|---|---|---|---|
| | | Polyol/flame retardant | | Polyol/flame retardant used in combination | | | | |
| Polyisocyanate | Polyisocyanate 1 | 100 | 100 | 100 | 100 | 100 | 100 | 100 |
| Polyol | Polyol 1 | 10 | 10 | 10 | 10 | 10 | 20 | 30 |
| | Polyol 2 | 0 | 0 | 0 | 0 | 0 | 0 | 0 |
| Flame retardant | Flame retardant 1 | 0 | 0 | 10 | 20 | 10 | 20 | 10 |
| | Flame retardant 2 | 0 | 0 | 5 | 5 | 10 | 5 | 5 |
| | Flame retardant 3 | 0 | 0 | 0 | 0 | 0 | 0 | 0 |
| | Flame retardant 4 | 10 | 0 | 0 | 0 | 0 | 0 | 0 |
| | Flame retardant 5 | 0 | 10 | 0 | 0 | 0 | 0 | 0 |
| Catalyst | Catalyst 1 | 1 | 1 | 1 | 1 | 1 | 1 | 1 |
| | Isocyanate index | 840 | 840 | 840 | 840 | 840 | 420 | 280 |
| | Period until surface B temperature reach 150° C. (minutes) | 39 | 48 | 117 | 82 | 90 | 86 | 73 |

TABLE 2

| Raw materials | unit: parts by weight | Comparative Example 1 | Comparative Example 2 | Comparative Example 3 |
|---|---|---|---|---|
| | | No polyol used | Polyol | Polyol/flame retardant used in combination |
| Polyisocyanate | Polyisocyanate 1 | 100 | 100 | 100 |
| Polyol | Polyol 1 | 0 | 50 | 50 |
| | Polyol 2 | 0 | 0 | 0 |

TABLE 2-continued

| | | Comparative Example 1 | Comparative Example 2 | Comparative Example 3 |
|---|---|---|---|---|
| Flame retardant | Flame retardant 1 | 0 | 0 | 10 |
| | Flame retardant 2 | 0 | 0 | 5 |
| | Flame retardant 3 | 0 | 0 | 0 |
| | Flame retardant 4 | 0 | 0 | 0 |
| | Flame retardant 5 | 0 | 0 | 0 |
| Catalyst | Catalyst 1 | 1 | 1 | 1 |
| | Isocyanate index | ∞ | 168 | 168 |
| Period until surface B temperature reach 150° C. (minutes) | | 15 | — (deformed) | — (deformed) |

The samples in Examples 1 to 15, which generally showed a heat resistance at which the period needed for the surface B to reach 150° C. was about 30 minutes or longer, were considered to have favorable heat resistance.

The results of the samples of Examples 1 to 3 (in which a polyol was used) show that the specific polyol components and the blending amount were effective to improve fire resistance (flame resistance), when compared with the results in Comparative Examples 1 to 3.

The results of the samples of Examples 4 to 10 (in which a polyol and a single flame retardant were used) were shown to have improved fire resistance (flame resistance), when compared with those in Examples 1 to 3.

It was also shown that the results of the samples of Examples 11 to 15 (in which a polyol and multiple flame retardants were used) showed very favorable fire resistance (flame resistance), when: (i) the flame retardant contains aluminum hydroxide and red phosphorus; (ii) aluminum hydroxide is contained in an amount of 10 to 20 parts by weight and red phosphorus is contained in an amount of 5 to 10 parts by weight with respect to 100 parts by weight of the polyisocyanate; and (iii) the ratio of aluminum hydroxide to red phosphorus (aluminum hydroxide:red phosphorus) is 1:1 to 4:1 by weight.

Although the heating test method using a burner according to the present invention is different from the test method demanded for the fireproof buildings under the Building Standards Law wherein the sample is heated according to the standard fire heating temperature curve (see FIG. 4) specified by ISO-834 in a refractory oven, the initial temperature rise curve of the heating test method as in FIG. 3 is stricter than that of ISO-834. Even under such a condition, the period needed for the surface B to reach 150° C. was kept at about 30 minutes or more. Accordingly, the samples were considered to show a performance sufficient as a fire-resistant structural material.

The refractory article according to the present invention that shows favorable fire resistance can be used in applications demanding various types of fire-resistant properties. In addition, since the production method is simple and the extent of the fire-resistant properties can be easily regulated, the refractory article will find applications in various fields.

By way of example, if a high-strength material is selected as the core material, the refractory article can be used as a structural member. Some examples of such structural members include structural members for buildings such as column, beam, wall, floor, girder, brace, and sill.

What is claimed:

1. A refractory article comprising
   (1) a core material comprising a composite wood-based structural material and
   (2) a refractory layer covering one or more surfaces of the core material, and comprising a non-foamed polyisocyanurate resin, wherein:
   the non-foamed polyisocyanurate resin comprises the reaction product of a polyisocyanate with an active hydrogen-containing compound, and a flame retardant; in which said active hydrogen-containing compound comprises a polyol having two or more hydroxyl groups, a hydroxyl number of 120 to 2000 mg-KOH/g, a functionality of 2 to 4, and a molecular weight of 50 to 2000; and from 5 to 30 parts by weight of said active hydrogen-containing compound is used per 100 parts by weight of polyisocyanate; and said flame retardant comprises from 10 to 20 parts by weight of aluminum hydroxide and from 5 to 10 parts by weight of red phosphorus, based on 100 parts by weight of said polyisocyanate, wherein the weight ratio of aluminum hydroxide to red phosphorus is from 1:1 to 4:1.

2. The refractory article according to claim 1, wherein said non-foamed polyisocyanurate resin is formed by the reaction of a polyisocyanate with an active-hydrogen containing compound in the presence of an isocyanuration catalyst.

3. The refractory article according to claim 1, wherein the core material (1) comprises a glued laminated timber.

4. The refractory article according to claim 1, wherein said polyisocyanate comprises at least one polyisocyanate selected from the group consisting of aromatic polyisocyanates, aliphatic polyisocyanates, alicyclic polyisocyanates- and the modified products thereof.

5. The refractory article according to claim 1, additionally comprising (3) a surface layer outside the refractory layer of the non-foamed polyisocyanurate resin (2).

6. The refractory article according to claim 1, wherein said refractory article is a structural member selected from the group consisting of column, beam, wall, floor, girder, brace and sill.

7. A method for producing the refractory article according to claim 1, comprising
   (i) placing a frame around the external periphery of a core material with a space between the core material and the frame;
   (ii) injecting a raw polyisocyanurate liquid into the space between the core material and the frame; and
   (iii) forming a solid non-foamed polyisocyanurate resin layer by reacting the raw polyisocyanurate liquid.

* * * * *